Figure 4:
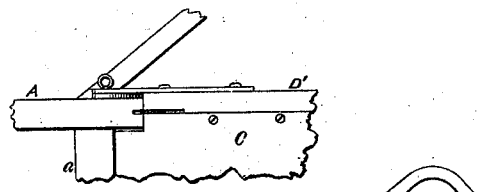
Figure 3:
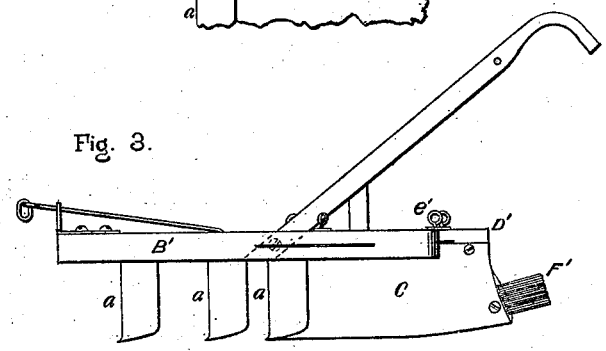
Figure 2:
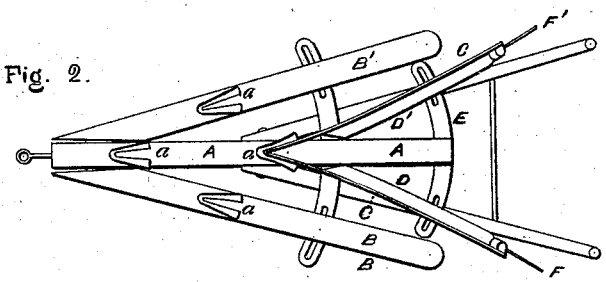
Figure 1:
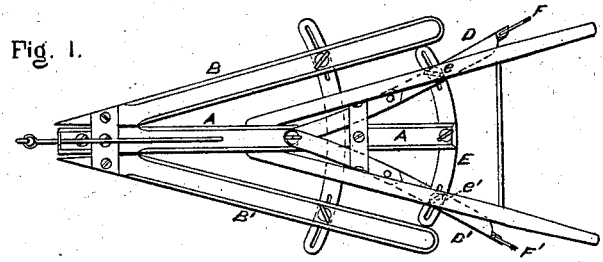

J. JENNINGS, Jr.
Cultivator.

No. 209,481. Patented Oct. 29, 1878.

Witnesses:

Inventor
John Jennings, Jr.
by J. E. Maynadier
his atty.

UNITED STATES PATENT OFFICE.

JOHN JENNINGS, JR., OF NATICK, MASSACHUSETTS.

IMPROVEMENT IN CULTIVATORS.

Specification forming part of Letters Patent No. 209,481, dated October 29, 1878; application filed July 20, 1876.

*To all whom it may concern:*

Be it known that I, JOHN JENNINGS, Jr., of Natick, in the county of Middlesex and State of Massachusetts, have invented a new and useful Improvement in Cultivators, which improvement is fully set forth in the following specification, reference being had to the accompanying drawings, making a part hereof.

My improvement consists in the attachment to the mold-boards of a cultivator of brushes, in order that the earth, after being loosened by the cultivator-teeth, or in any other convenient way, may be thrown well round the plants without injury to them, very much the same as if a hand-hoe were used.

In the drawings is shown my improvement attached to a cultivator of the form best adapted for my purpose, in which A is the central beam, to which the two lateral beams B B' are attached. *a a* are cultivator-teeth. To the central beam A is fastened a double mold-board, C C', which is secured along its upper edges to the two beams D D'. These beams are laterally adjustable, being clamped to the brace E by the screws *e e'* through the slots at each end of the brace E. F F' are brushes attached firmly to the rear ends of the double mold-board, so that although the effect on the loose earth is much the same as if the mold-board had been increased in length, yet the brushes, being flexible, cannot do the damage to the crops which a rigid mold-board of the same length would.

In order to attain the best results my brush should be used with an adjustable mold-board, as above described; but this is, of course, not necessary.

What I claim as my invention is—

The combination of the mold-board C with the brush F, attached to its end, substantially as and for the purpose described.

JOHN JENNINGS, JR.

Witnesses:
    J. E. MAYNADIER,
    GEO. O. G. COALE.